US008374406B2

(12) United States Patent
Higuchi

(10) Patent No.: US 8,374,406 B2
(45) Date of Patent: Feb. 12, 2013

(54) IMAGE READING APPARATUS FOR FEATURE IMAGE OF LIVE BODY

(75) Inventor: Teruyuki Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 998 days.

(21) Appl. No.: 11/741,320

(22) Filed: Apr. 27, 2007

(65) Prior Publication Data

US 2007/0253606 A1 Nov. 1, 2007

(30) Foreign Application Priority Data

Apr. 28, 2006 (JP) ................................. 2006-124711

(51) Int. Cl.
*G06K 9/00* (2006.01)
(52) U.S. Cl. ...................................................... 382/124
(58) Field of Classification Search .................... 382/124
See application file for complete search history.

(56) References Cited

U.S. PATENT DOCUMENTS

| | | | |
|---|---|---|---|
| 4,699,149 A | 10/1987 | Rice | |
| 5,177,802 A | 1/1993 | Fujimoto et al. | |
| 6,259,804 B1 | 7/2001 | Setlak et al. | |
| 6,381,347 B1 | 4/2002 | Teng et al. | |
| 6,785,407 B1 | 8/2004 | Tschudi et al. | |
| 2001/0026632 A1 | 10/2001 | Tamai | |
| 2002/0067845 A1 | 6/2002 | Griffis | |
| 2003/0063783 A1* | 4/2003 | Higuchi | 382/125 |
| 2003/0161510 A1 | 8/2003 | Fujii | |
| 2004/0017891 A1* | 1/2004 | Endo | 378/98.8 |
| 2004/0252867 A1 | 12/2004 | Lan et al. | |
| 2005/0047632 A1* | 3/2005 | Miura et al. | 382/124 |
| 2006/0089546 A1* | 4/2006 | Mahony et al. | 600/310 |
| 2006/0142649 A1 | 6/2006 | Sato | |
| 2006/0182318 A1 | 8/2006 | Shigeta | |

FOREIGN PATENT DOCUMENTS

| | | |
|---|---|---|
| JP | 04-190470 | 7/1992 |
| JP | 05-168610 | 7/1993 |
| JP | 08-154921 | 6/1996 |
| JP | 10-91769 | 4/1998 |
| JP | 10-143663 | 5/1998 |
| JP | 10-208022 | 8/1998 |
| JP | 10-222641 | 8/1998 |
| JP | 10-255050 A | 9/1998 |
| JP | 3045629 | 3/2000 |
| JP | 3150126 | 1/2001 |
| JP | 2001-92951 | 4/2001 |
| JP | 2001-155137 | 6/2001 |
| JP | 2002-49913 | 2/2002 |
| JP | 2003-6627 | 1/2003 |

(Continued)

*Primary Examiner* — Anand Bhatnagar
*Assistant Examiner* — Soo Park
(74) *Attorney, Agent, or Firm* — Dickstein Shapiro LLP

(57) ABSTRACT

In an aspect of the present invention, an image reading apparatus includes a 2-dimensional image sensor having a plurality of light receiving elements arranged in a matrix, and configured to detect an image of a detection target; and a plurality of partition walls configured to hold the detection target in a non-contact state in a predetermined distance from an upper surface of the 2-dimensional image sensor. The plurality of partition walls may be provided on the 2-dimensional image sensor to form a plurality of slits. Also, the plurality of partition walls may function as shading members. Instead, the plurality of partition walls may function as light transmissible members. In this case, the refractive index of the plurality of partition walls may be larger than 1.1 and is smaller than 1.4 or is larger than 2.0 and is smaller than 5.0.

11 Claims, 15 Drawing Sheets

FOREIGN PATENT DOCUMENTS

| | | |
|---|---|---|
| JP | 2003-85538 | 3/2003 |
| JP | 2003-150943 | 5/2003 |
| JP | 2003-303178 | 10/2003 |
| JP | 2003-308516 A | 10/2003 |
| JP | 2004-234040 | 8/2004 |
| JP | 2005-174280 | 6/2005 |
| JP | 2005-182474 | 7/2005 |
| JP | 2005-242907 | 9/2005 |
| JP | 2006-72764 | 3/2006 |
| JP | 2006-98340 | 4/2006 |
| JP | 2006-234040 A | 9/2006 |
| WO | WO-2004/026139 A1 | 4/2004 |

* cited by examiner

Fig. 15A  Fig. 15B  Fig. 15C
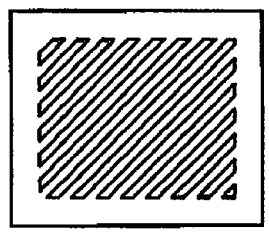
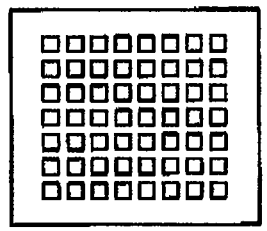
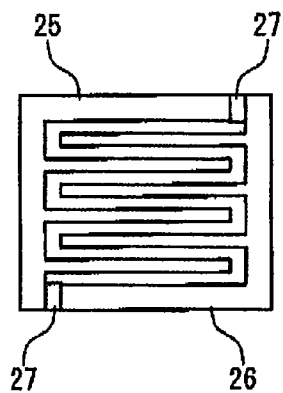
Fig. 16A
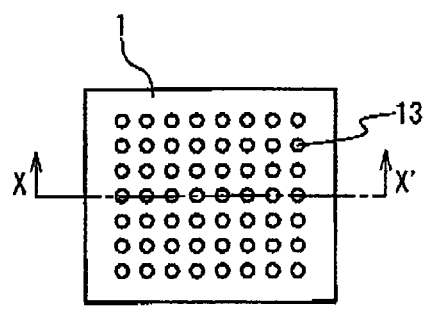
Fig. 16B
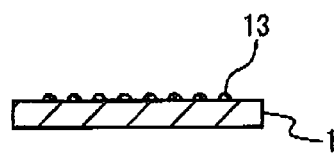

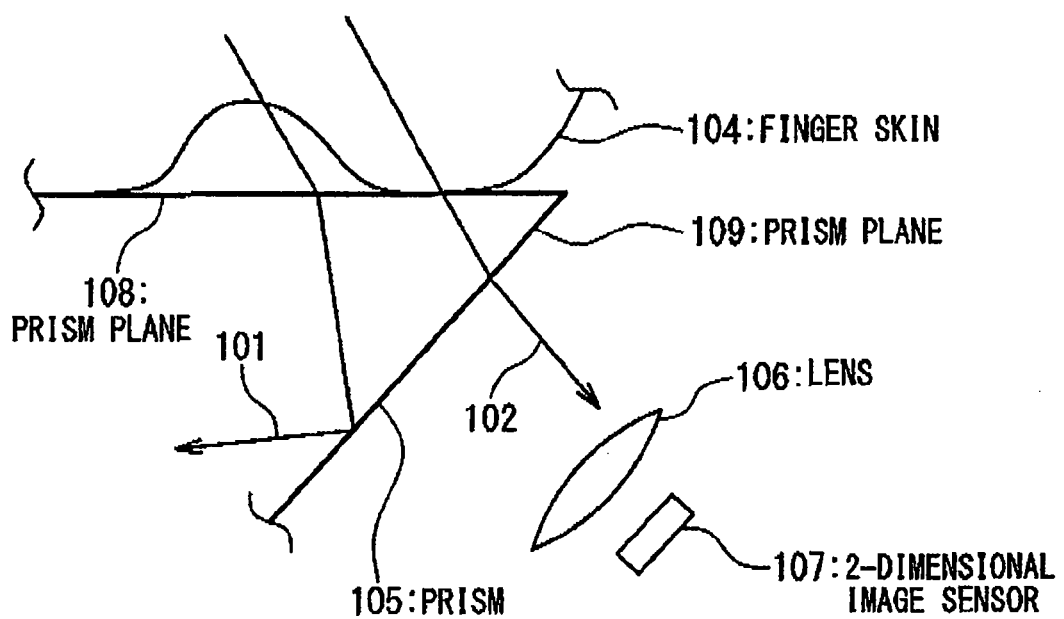

IMAGE READING APPARATUS FOR FEATURE IMAGE OF LIVE BODY

CROSS REFERENCE TO RELATED APPLICATIONS

This application is related to the U.S. application Ser. Nos. 11/741,645 filed Apr. 27, 2007 and 11/719,293 filed on May 14, 2007, and claims priority to Japanese application no. 2006-124711 filed on Apr. 28, 2006, the disclosure of which is incorporated by reference in its entirety.

BACKGROUND OF THE INVENTION

1. Field of the Invention

The present invention relates to an image reading apparatus, and more particularly relates to an apparatus for reading an image indicating features of a living body such as a fingerprint of a finger and another skin pattern, in order to authenticate a person.

2. Description of Related Art

Conventionally, as an image reading apparatus for authenticating a person by using a finger, an apparatus is known for reading a fingerprint that is a pattern of a skin of a fingertip. Various types of reading apparatus that uses an absolute value or a change value of a physical value such as light, electric field, pressure, capacitance and temperature, has been developed.

A method that uses a total reflection critical angle in a fiber optic plate (as disclosed in Japanese Patent No. 3045629: first conventional example) or a prism (as disclosed in U.S. Pat. No. 6,381,347: second conventional example) is widely used as a fingerprint input apparatus. FIG. 17 shows a conventional example that uses the total reflection critical angle of the prism. With reference to FIG. 17, a lens 106 and a 2-dimensional image sensor 107 are arranged in a direction perpendicular to a prism plane 109. A skin 104 of a finger is illustrated by enlarging the pattern of the skin. When a light 101 is inputted from an air portion having the refractive index of 1.0 where the skin is not in contact with the prism 105 in to the prism 105 having the refractive index of 1.4, the light has greatly refraction and is totally reflected on the prism plane 109, so that the light does not arrive at the 2-dimensional image sensor 107. However, a light 102 inputted into the prism 105 at a portion where the skin is in contact with the prism 105 never reaches the total reflection angle on the prism plane 109 because the refractive index of fats and oils or water on the skin or skin surface is near to that of prism glass so that a refraction angle on the prism plane 108 becomes small. Thus, the finger pattern is imaged on the 2-dimensional image sensor 107 by the lens 106. Thus, the pattern of the skin such as a fingerprint can be detected as a shadow pattern based on whether or not the concave and convex portions of the finger are brought into contact with the prism.

A conventional technique is proposed in which the optical system such as the prism and the lens is removed, although the 2-dimensional image sensor is used, in order to attain the miniaturization of an apparatus, and a finger is brought into contact with the 2-dimensional image sensor to detect a fingerprint image, as disclosed in Japanese Laid Open Patent Application (JP-P 2001-92951A: third conventional example). This conventional technique will be described below with reference to FIGS. 18A and 18B. The image reading apparatus shown in FIGS. 18A and 18B is provided with a 2-dimensional image sensor 2004 in which a plurality of photo sensors 2001 such as a double-gate type transistors are arranged in a matrix on a glass substrate 2002, and a insulating protection film 2003 having an optically transmissible property is coated on the entire surface; a transparent conductive film 2005 formed to have a predetermined pattern on the surface of the 2-dimensional image sensor 2004; and a planar light source 2007 which is placed on the rear of the 2-dimensional image sensor 2004 and emits a uniform light to the finger in contact with the top plane of the 2-dimensional image sensor 2004. Here, the transparent conductive film 2005 is composed of a pair of conductive patterns 2005a and 2005b, and at least one of them is grounded.

Also, both of the conductive patterns 2005a and 2005b are formed only on the mutual gap between the photo sensors 2001, in order to avoid the region immediately over the photo sensor 2001. The 2-dimensional image reading apparatus as configured above is operated as follows.

When a finger is placed to be in contact with a pair of conductive patterns 2005a and 2005b, the static electricity charged on the finger is discharged through any one of the conductive patterns 2005a and 2005b to the ground. Then, the operation for reading the fingerprint is started. That is, light is inputted to the finger through the 2-dimensional image sensor 2004 from the planar light source 2007, and is propagated while being scattered and reflected on the skin cortex of the finger. Then, a portion of the propagated light is inputted as excitation light into a photo sensor 2001 opposite to the convex (ridge) section of the fingerprint where there is no air layer whose refractive index is low on the boundary between the insulating protection film 2003 and the skin cortex of the finger. On the other hand, the other portion of the light is inputted into the photo sensor 2001 opposite to the concave (valley) section of the fingerprint where the air layer exists on the boundary between the insulating protection film 2003 and the skin cortex is suppressed. As a result, a pattern image is obtained in which the convex portion of the finger pattern serves as a bright region, and the concave portion serves as a dark region. In this way, in the image reading apparatus of FIGS. 18A and 18B, while the finger is brought into contact with the top plane of the 2-dimensional image sensor 2004, the fingerprint image is read. Thus, the transparent conductive film 2005 is made thin not to disturb the contact between the finger and the 2-dimensional image sensor 2004.

Similarly, the skin is brought into contact, so that a fingerprint image is obtained. However, in order to attain further miniaturization, other techniques re proposed in Japanese Laid Open Patent Applications (JP-A-Heisei 10-91769 and JP-P2001-155137A: fourth and fifth conventional examples). In such techniques, a quasi one-dimensional sensor of a pressure or temperature or capacitance type is used, and partial images of the fingerprint of a finger that is obtained by moving the finger in contact with the quasi one-dimensional sensor are linked to reconfigure the fingerprint image. In particular, methods that use the capacitance and the temperature are already available in a market. These methods contribute to the miniaturization and lower price of the apparatus.

Under such a situation, a non-contact fingerprint detecting apparatus is proposed as disclosed in Japanese Laid Open Patent Application (JP-P2003-85538A: a sixth conventional example). This conventional technique uses a phenomenon that when light is inputted into a finger, scattered inside the finger and emitted from the finger again, the light reflects the inner structure of the skin, so that the concave of the fingerprint serves as a bright region and the convex serves as the dark region. Thus, the dense/light image having the same shape as the fingerprint is obtained. According to this non-contact method, even in the finger whose skin is stripped due to dermatitis so that it is hard to read the fingerprint because contact of a skin separation portion is difficult in a method where the foregoing contact is assumed, the fingerprint image can be obtained if a portion of a structure inside the skin deriving a skin pattern is reserved. Also, in case of non-contact, it is difficult to receive the influence of the state change on the skin surface, such as a wet or dry state.

Also, a fingerprint input apparatus was proposed by the inventors of the present invention as disclosed in Japanese Patent No. 3150126 (a seventh conventional example). In this conventional apparatus, a fingerprint image is imaged by detecting the scattered emission light from the finger by a 2-dimensional image sensor located closely to the finger through a transparent protection cover made of glass. Thus, a concave portion of the fingerprint serves as a dark region and a convex serves as a bright region. This is hard to receive the influence of the external environment such as a wet or dry state of the finger, and the external disturbance light as compared with a sensor that uses pressure, temperature, capacitance and a total reflection critical angle. Also, as described in Japanese Laid Open Patent Application (JP-P2003-006627A; an eighth conventional example) proposed by the inventor of this application, the image of a high contrast can be obtained by optimally selecting the refractive index of the transparent protection cover.

In recent years, in conjunction with the advancement of information system, the leakage of person information and the spoofing of a different person in a transaction on a network become problematic. In order to prevent occurrence of those problems, an apparatus was developed which inputs a feature of a living body peculiar to a person and authenticates the person, instead of a method that easily allows the spoofing of the different person by stealing or furtively looking at a password or an authentication card. Also, the miniaturization of an information processing apparatus in a lower price represented by a portable phone have been advanced, and the apparatus for inputting the living body feature is also required to be miniaturized and cheapened. Moreover, since the personal authentication using the living body feature is applied for the settlement by using a credit card, the necessity of the higher precision of the living body feature input apparatus is increased more and more, in order to surely authenticate the person under any situation.

The property of the fingerprint that there is no same fingerprint from ancient times and it is never changed in one's life is verified in the police and justice fields, and the person authentication of a high precision is possible by using the fingerprint. However, in the conventional fingerprint input apparatus, it is difficult to obtain an excellent fingerprint image under a bad condition such as a wet or dry state of the finger, and skin peeling caused by dermatitis. Thus, although the fingerprint is not same between all people, it is hardly said to be able to be used for all people.

The fingerprint input method that uses a total reflection critical angle via the fiber optic plate (for example, the first conventional example) or the prism (for example, the second conventional example) is widely used for the personal authentication. However, as described in the related art, since the shade of the fingerprint is generated by the contact between the concave and convex sections of the skin and the prism, the image on the skin peeling portion is lost. Also, the use of the expensive large optical part obstructs the miniaturization and lower price of the apparatus. The image reading apparatus described in the third conventional example contributes to the miniaturization and the lower price, because the optical parts are removed. However, since the shade of the fingerprint is generated by the contact between the concave convex of the skin and the 2-dimensional image sensor plane, the image on the skin separation portion is lost.

With regard to the 2-dimensional sensor of the pressure, electric field or capacitance type, there are several actual use examples. Since the optical parts are removed, this contributes to the miniaturization and the lower price. However, any of them has a contact mechanism as the assumption, and the image on the skin peeling portion is lost. Also, as compared with the optical method, this type of apparatus is weak for the condition change such as the wet or dry state of the finger.

The technique that uses the quasi 1-dimensional sensor of a pressure, temperature, electric field or capacitance type and slides the finger in contact with the sensor and then reconfigures the image of the fingerprint of the finger (for example, the fourth and fifth conventional example) contributes to the further miniaturization and lower price of the apparatus. However, the image on a non-contact portion is lost. Thus, if the skin is partially stripped because of dermatitis, the fingerprint authentication, namely, the authentication based on the living body feature is difficult. Also, the method that uses the sensor of the 1-dimensional type and moves a reading target and reconfigures the image is already known in a facsimile and a copier. However, this technique has a problem where in order to miniaturize the apparatus, if the special mechanism for getting a speed of a direction in which the finger is moved is omitted, the image reconfiguration precision of the fingerprint is reduced.

As the technique for improving the decrease in the authentication precision caused by the peeling of the skin, a non-contact fingerprint detection apparatus is proposed in the sixth conventional example. According to this proposal, the emission light, which is inputted to the finger and scattered inside the finger and then emitted from the skin surface of the finger, reflects the inner structure of the skin. Thus, the dense/light shape corresponding to the fingerprint is observed. In this proposal, independently of the wet or dry state of epidermis and even when the epidermis horny layer is stripped and dropped because of dermatitis, if the structure of cutis serving as the origin of an epidermis pattern of the fingerprint is reserved, the fingerprint image is obtained. However, in case of the fingerprint detecting apparatus described in the sixth conventional example, a fixing frame for fixing the finger is required and an image forming optical system is also required, which obstructs the operability and miniaturization of the apparatus. Also, the finger and the image forming system are greatly separated. Thus, even if the inner structure of the finger causes a light quantity emitted from the skin surface to be changed, it is scattered on the skin surface, and the event, which is estimated based on a adverse influence caused due to a spread resulting from the distance of the image forming system, resulting in a problem that the fingerprint image of the excellent contrast is not obtained in the portion where the skin is actually stripped.

On the contrary, in the fingerprint authenticating apparatus (the seventh conventional example) invented by this inventor, the emission light that is emitted from the skin surface after scattered inside the finger is imaged by the 2-dimensional image sensor located closely to the finger, and the fingerprint image is obtained. Then, the miniaturization and lower price of the apparatus are attained. Also, in the technique for reading the scattered emission light from the finger, since the light is once inputted to the inside of the finger, the structure inside the finger is obviously reflected. Thus, in the fingerprint input apparatus according to the seventh conventional example by this inventor, the optical image forming system is removed, thereby attaining some small fingerprint detecting apparatus, and as the phenomenon in the non-contact portion where the skin is stripped, the image in which the inner structure of the skin of the finger is reflected, as pointed out in the sixth conventional example.

On the other hand, the fact that the fingerprint image through the scattered emission light from the finger greatly depends on the boundary state between the skin and the sensor protecting film is clarified by the eighth conventional example related to the proposal of this inventor. That is, the eighth conventional example describes that a refractive index of a transparent cover existing between the fingerprint and the 2-dimensional image sensor placed closely thereto is selected so as to increase the contrast between the bright region corresponding to the convex of the fingerprint in contact with the transparent cover and the dark region corresponding to the concave that is not contact. However, in case of such selection, the influence of the reflection and refraction of the boundary becomes strong which decreases the component reflecting the skin structure. Thus, this has a problem where it is hard to obtain the contrast of the fingerprint image in which the skin structure originally appearing in the skin separation portion is reflected. This problem is especially severe in case where a dynamic range is not widely set. If the non-contact state is kept, the influence of the boundary is removed. However, the configuration for using the fixing frame for the finger and the image forming optical system as proposed in the sixth conventional example brings about the foregoing problem.

SUMMARY

Therefore, an object of the present invention is to provide an image reading apparatus, which has a small size and a low price and can stably input features of a living body such as a fingerprint of a finger by using a 2-dimensional image sensor.

In an aspect of the present invention, an image reading apparatus includes a 2-dimensional image sensor having a plurality of light receiving elements arranged in a matrix, and configured to detect an image of a detection target; and a plurality of partition walls configured to hold the detection target in a non-contact state in a predetermined distance from an upper surface of the 2-dimensional image sensor.

The plurality of partition walls may be provided on the 2-dimensional image sensor to form a plurality of slits. Also, the plurality of partition walls may function as shading members. Instead, the plurality of partition walls may function as light transmissible members. In this case, the refractive index of the plurality of partition walls may be larger than 1.1 and is smaller than 1.4 or is larger than 2.0 and is smaller than 5.0.

Also, a light transmissible filler is inserted in each of the plurality of slits. In this case, a refractive index of the plurality of partition walls may be larger than 1.1 and is smaller than 1.4 or is larger than 2.0 and is smaller than 5.0.

Also, the plurality of slits may be located directly on or above the plurality of light receiving elements of the 2-dimensional image sensor. Also, the height of each of the plurality of partition walls may be equal to or more than 10 µm and equal to or less than 200 µm.

The image reading apparatus may further include a light source configured to illuminate the detection target from a back side of the 2-dimensional image sensor. In this case, the light source comprises a plurality of planar light sources which are arranged in a vertical scanning direction of the 2-dimensional image sensor and which can be individually turned off or on. When read rows are sequentially scanned, the plurality of planar light sources other than the planer light source corresponding to the scanned read row may be turned on.

Also, the image reading apparatus may further include an image processing section configured to hold a reference read image of a target having no pattern and to subtract the reference read image from the image read by the 2-dimensional image sensor.

Also, the plurality of partition walls and the 2-dimensional image sensor may be unified. The plurality of partition walls may be provided for a lattice plate located on the 2-dimensional image sensor.

According to the present invention, it is possible to stably input features of a living body such as the fingerprint of a finger by using the 2-dimensional image sensor. This is because with a plurality of partition walls installed on the top plane of the 2-dimensional image sensor, the finger cushion of the finger that is pushed from above is kept in the non-contact state at the constant distance from the top plane of the 2-dimensional image sensor, and the finger that is always in the non-contact state at the constant distance can be imaged by the 2-dimensional image sensor.

Also, it is possible to input the living body feature even under the bad condition such as the wet or dry state of the finger, the skin separation caused by the dermatitis, and the like. This is because, while the finger is kept in the non-contact state at the constant distance from the top plane of the 2-dimensional image sensor, the image through the emission light emitted from the skin surface of the finger at that state is imaged by the 2-dimensional image sensor, and the image of the finger where the structure inside the finger is consequently reflected can be read. Moreover, this effect will be described below by using the actual image example. FIG. 19 shows the image based on the method that uses the total reflection critical angle, among the methods in which the conventional contact is assumed, and the image is lost on the skin separation portion located at the substantial center in the image. On the other hand, FIG. 4 shows the image example of the same portion of the same finger, according to the embodiment of the present invention, and the contrast is obtained in the same skin separation portion. FIG. 8 further shows the image example of the same portion in another embodiment of the present invention, and even in this image, although the bright/dark relation is inverted with respect to the skin separation portion, the image is obtained without any loss.

Moreover, it is possible to provide the image reading apparatus, which has the small scale and the low price and can input the living body feature. This is because, since this contains the plurality of partition walls to keep the finger in the non-contact state at the constant near distance from the top plane of the 2-dimensional image sensor, the image forming optical system such as the lens and the like is not required.

BRIEF DESCRIPTION OF THE DRAWINGS

FIGS. 15A, 15B and 15C are plan views showing the other pattern examples of the partition walls in the lattice plate;

FIGS. 16A and 16B are a top view and a lateral sectional view, which show another example of partition walls for carrying out a role as a guide so that a skin surface of a skin keeps a non-contact state at a constant distance from a top plane of the 2-dimensional image sensor;

FIG. 17 is a view showing a principle of a conventional optical prism method;

DESCRIPTION OF THE PREFERRED EMBODIMENTS

Hereinafter, an image reading apparatus according to the present invention will be described in detail with reference to the attached drawings.

First Embodiment

Figure 1A:
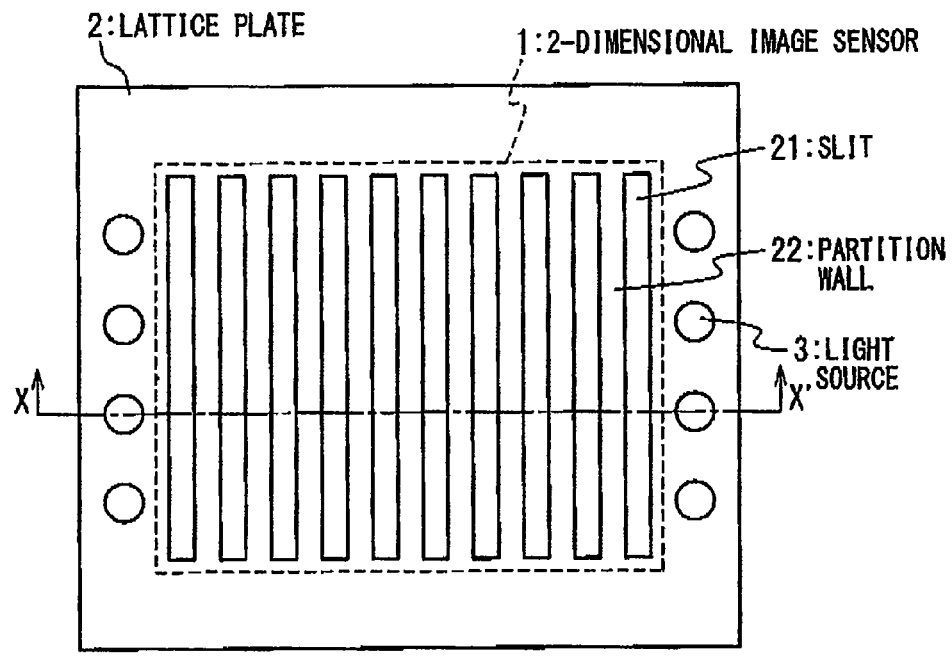
FIGS. 1A and 1B are a top view and a lateral sectional view of an image reading apparatus according to a first embodiment of the present invention.
Figure 1B:
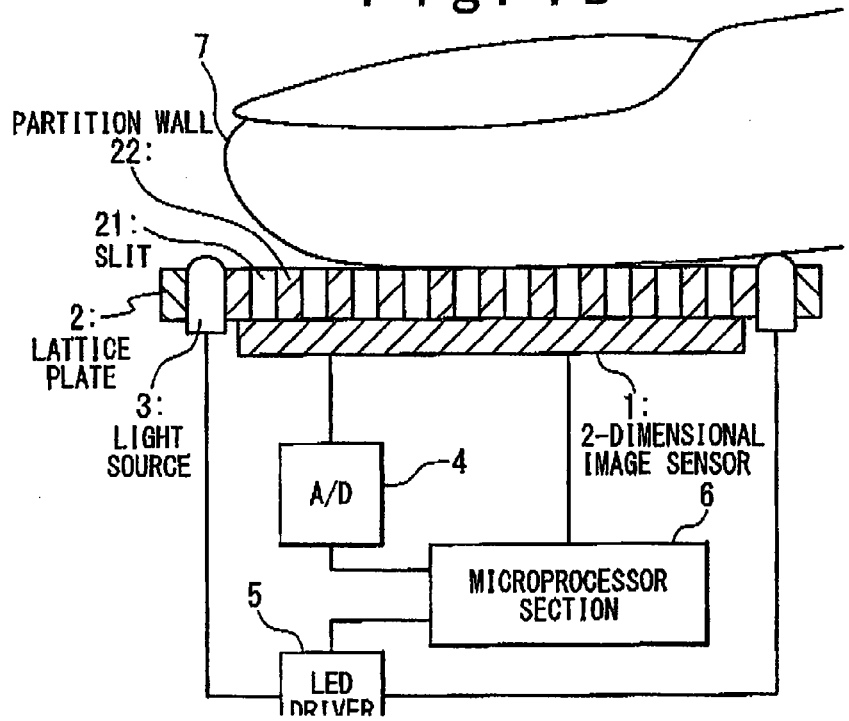

FIGS. 1A and 1B are diagrams showing the configuration of the image reading apparatus according to the first embodiment. With reference to FIG. 1, the image reading apparatus according to the first embodiment is provided with a 2-dimensional image sensor 1 in which a plurality of light receiving elements (not shown) are arranged in a matrix in a pitch that is narrower than pitches between ridges or valleys in a fingerprint. The image reading apparatus further includes a lattice plate 2 in which a plurality of partition walls 22 are arranged in parallel to each other so as to form a large number of slits 21 and in which the bottom planes of the partition walls 22 are attached to the top plane of the 2-dimensional image sensor 1. Also, the image reading apparatus further includes a plurality of light sources 3 such as LEDs, which are provided in openings formed in the periphery of this lattice plate 2; and an A/D converter 4 for converting an analog output signal of the 2-dimensional image sensor 1 into a digital signal. Moreover, the image reading apparatus further includes a driver 5 for driving the light sources 3; and a micro processor 6 for executing a control of imaging timing of the 2-dimensional image sensor 1, a control to turn on and off the light sources 3, and a imaging process for the digital signal outputted from the A/D converter 4.

In the lattice plate 2, a plate material having a light shielding property such as a metal plate is thinly processed, and slits 21 are formed in the center. The partition walls 22 play a role as a guide so that, when a finger 7 serving as a detection sample is put on the 2-dimensional image sensor 1, the skin surface of the finger 7 keeps the non-contact state in a preset distance from the top plane of the 2-dimensional image sensor 1. In order to keep the non-contact state, as the width of the slit 21 becomes wider, the height of the partition wall 22 is required to be higher. However, if the height of the partition wall 22 is 200 μm or more, the unclearness of the image becomes severe, and if the width of the slit 21 becomes narrower than the diameter of the light receiving element, a light receiving amount is decreased. The actual size is also related to the pitch between the light receiving elements of the 2-dimensional image sensor 1. Thus, the height of the partition wall 22 and the width and pitch of the slit 21 are determined in consideration to various conditions.

Figure 2A:
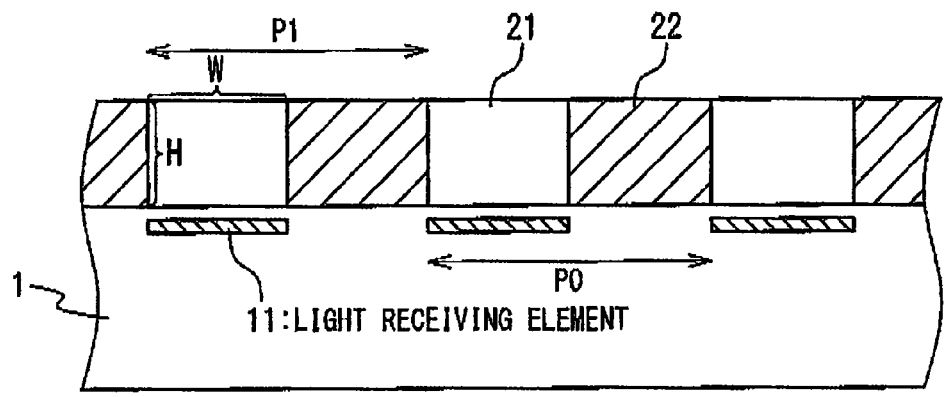
FIGS. 2A to 2C are diagrams showing a relation a pitch of light receiving elements in a 2-dimensional dimensional image sensor and a pitch of partition walls in a lattice plate.

For example, as shown in FIG. 2A, in case of the structure in which a pitch P0 between the light receiving elements 11 in the 2-dimensional image sensor 1 and a pitch P1 between the partition walls 22 are made equal to carry out the positioning, the width W of the slit 21 may be set to be approximately equal to a diameter of the light receiving element 11, and the height H of the partition wall 22 may be set to be equal to or greater than the slit width W and 200 μm or less. In this case, in the 2-dimensional image sensor 1 in which the light receiving elements 11, for example, each having the light receiving diameter of 25 μm, are arranged at 500 DPI, for example, P1=about 50 μm, W=about 25 μm, and H=about 25 μm to about 200 μm.

Figure 2B:
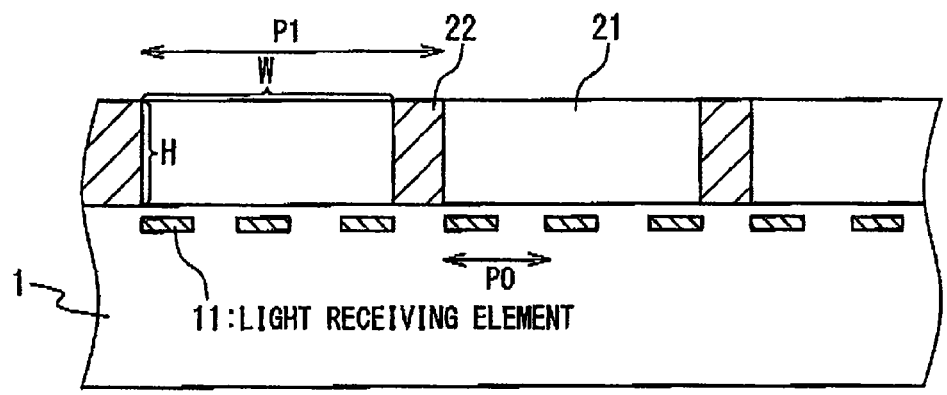

Also, as shown in FIG. 2B, it is allowable to employ the structure in which the pitch P1 between the partition walls 22 is set to be n times (n is a positive integer of 2 or more) the pitch P0 between the light receiving elements 11 in the 2-dimensional image sensor 1 and the positioning is carried out. In this case, in the 2-dimensional image sensor 1 in which the light receiving elements 11 each having the light receiving diameter of 25 μm are arranged in 500 DPI, for example, P1=about 150 μm, W=about 125 μm, and H=about 125 μm to about 200 μm.

Figure 2C:
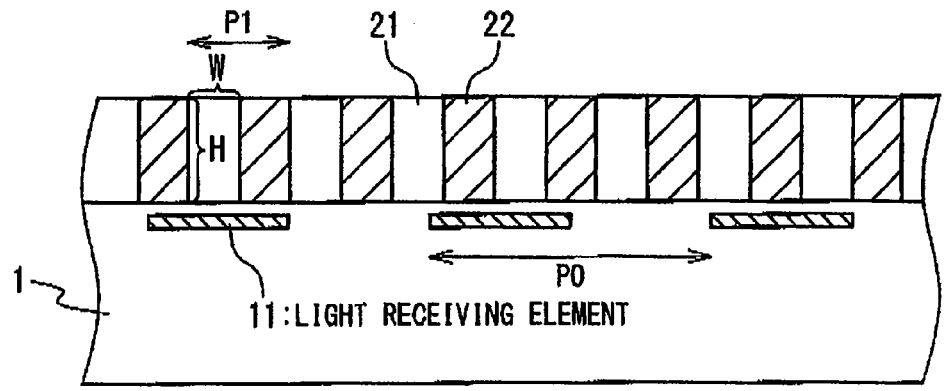

Moreover, when the pitch P1 between the partition walls 22 is set to be shorter than a half of the pitch P0 between the light receiving elements 11 in the 2-dimensional image sensor 1, at least one slit 21 can be correlated to each light receiving element 11, as shown in FIG. 2C. Thus, it is not required to perform the accurate positioning between the slit 21 and the light receiving elements 11 as shown in FIGS. 2A and 2B. In this case, in case of the 2-dimensional image sensor 1 in which the light receiving elements 11, for example, each having the light receiving diameter of 25 μm are arranged in 500 DPI, when P=about 20 μm is defined, W=about 10 μm and H=about 10 μm to about 200 μm.

When the image reading apparatus in the first embodiment is used to read the fingerprint of the finger 7, as shown in FIG. 1B, the finger cushion is pushed against the partition wall 22 of the lattice plate 2 located above the 2-dimensional image sensor 1. To the extent that the finger cushion is lightly pushed, the finger cushion regions are not brought into contact with the partition wall 22. However, when the finger cushion is strongly pushed, the elasticity of the skin makes the finger cushion of the finger 7 flat so that the entire finger cushion is brought into contact. Even at this time, the non-contact state between the skin of the finger 7 and the top plane of the 2-dimensional image sensor 1 is held by the partition wall 22.

Figure 3:
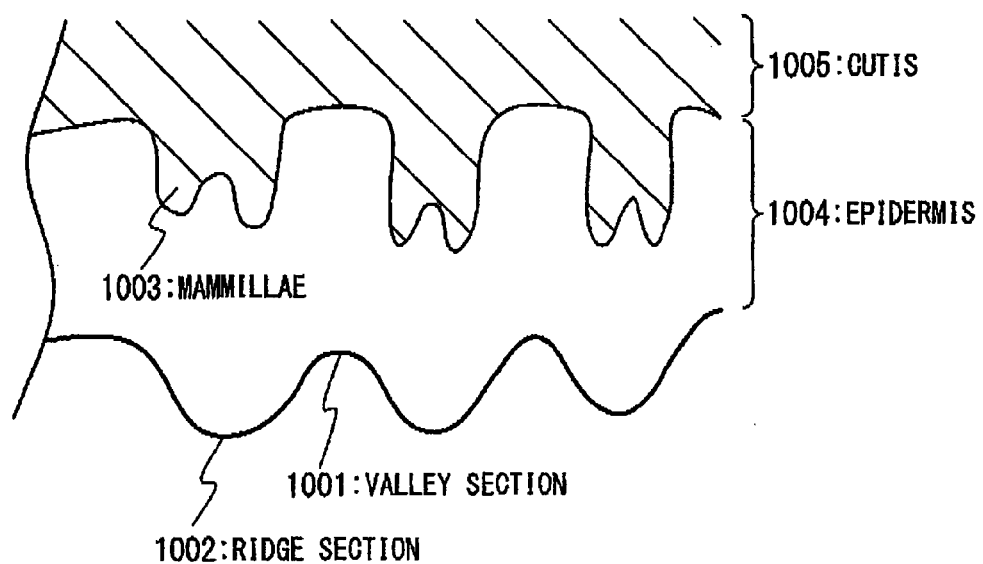
FIG. 3 is a diagram showing an inner structure of a skin of a finger.

In this situation, under the control of the micro processor 6, the light sources 3 are turned on by the LED driver 5. Also, light is inputted from the light sources 3 into the finger 7, scattered inside the finger 7 and emitted from the skin surface of the finger 7, and the light is imaged by the 2-dimensional image sensor 1. Here, the light, which is emitted from the skin surface of the finger 7 after scattered inside the finger 7, forms shades in accordance with the inner structure of the finger shown in FIG. 3. There is a cutis 1005 as organization inside the epidermis 1004, and mammillae 1003 exist below a ridge 1002 serving as the convex of the fingerprint. The cutis 1005 including the mammillae includes much water and oil components as compared with the epidermis 1004. Thus, the difference is generated in the refractive index. Thus, with this mammillae from the fingerprint ridge section, in the lattice plate 2, the emission light is considered to be decreased as compared with the valley section 1001 serving as the concave section of the fingerprint. For this reason, the input emission to the light receiving element 11 located closely to the ridge 1002 among the light receiving elements 11 arranged in the 2-dimensional image sensor 1, is small as compared with the light receiving element 11 located closely to the valley 1001. Therefore, the pattern image is obtained in which the valley 1001 serves as the bright region and the ridge 1002 serves as the dark region.

Figure 4:
FIG. 4 is a diagram showing an example of a fingerprint image read by an image reading apparatus according to the present invention.
Figure 19:
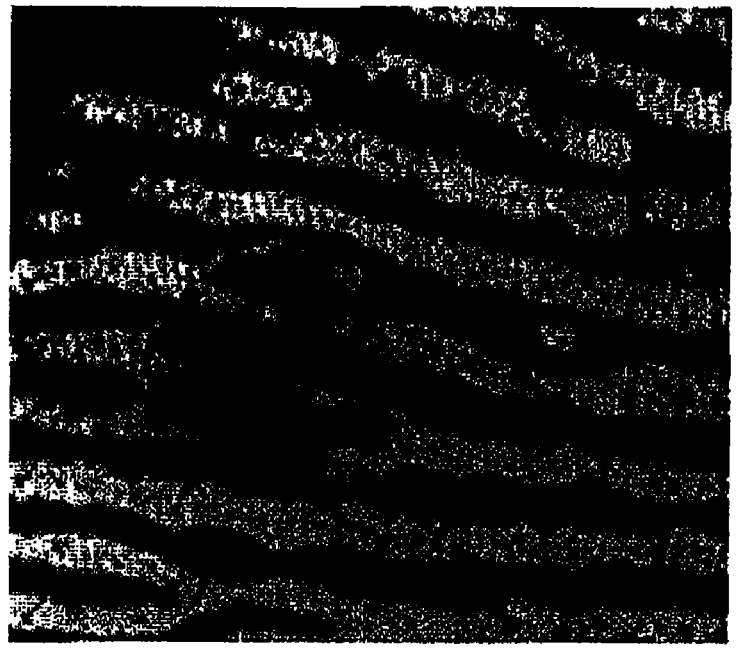
FIG. 19 is a view showing a fingerprint image example inputted in a fingerprint input apparatus that uses a conventional total reflection critical angle.

The fingerprint image of the finger 7 read by the image reading apparatus in the first embodiment becomes the image shown in FIG. 4. On the contrary, the image based on the method of using a total reflection critical angle among the methods in which the conventional contact is assumed becomes the image shown in FIG. 19. Both of them exhibit an image example of the same portion of the same finger. However, in the skin separation portion located on the substantial center of the image, although the pattern is lost in FIG. 19, the pattern of a moderate contrast is obtained in FIG. 4.

AN analog signal applied to the pattern image obtained by the 2-dimensional image sensor 1 is converted into the digital signal by the A/D converter 5 and inputted to the micro processor 6. The micro processor 6 receives the digital signal from the A/D converter 5 and performs a suitable imaging process.

According to this embodiment, by using the 2-dimensional image sensor 1 without using any unnecessary optical parts, the pattern image of the skin in which the inner structure of the finger 7 is directly reflected can be stably read without any influence of the wet or dry state of the finger 7. Also, the apparatus can be simplified and miniaturized. This reason results from the structure in which with the partition walls 22 of the lattice plate 2 placed on the top plane of the 2-dimensional image sensor 1, the finger 7 is read in a situation held in the non-contact state at the constant distance from the top plane of the 2-dimensional image sensor 1.

Also, when the contracted optical system described in the sixth conventional example is used, even in the skin separation portion in which the good contrast is not obtained by the phenomenon that it is spread on the surface of the skin and consequently spread via the lens and the optical path, the pattern of the good contrast in which the structure inside the finger is reflected is obtained according to the first embodiment. This reason is considered as follows. That is, in the first embodiment, since the light is directly inputted from the finger to the 2-dimensional image sensor 1 in the distance close to the finger 7, the components that are spread on the surface of the skin and mixed into each other are decreased.

Moreover, in case of the first embodiment, a moderate friction force is generated between the partition wall 22 and the finger 7. Thus, the movement of the finger 7 during the imaging can be suppressed, thereby obtaining the pattern image without any blurring.

Second Embodiment

Figure 5:
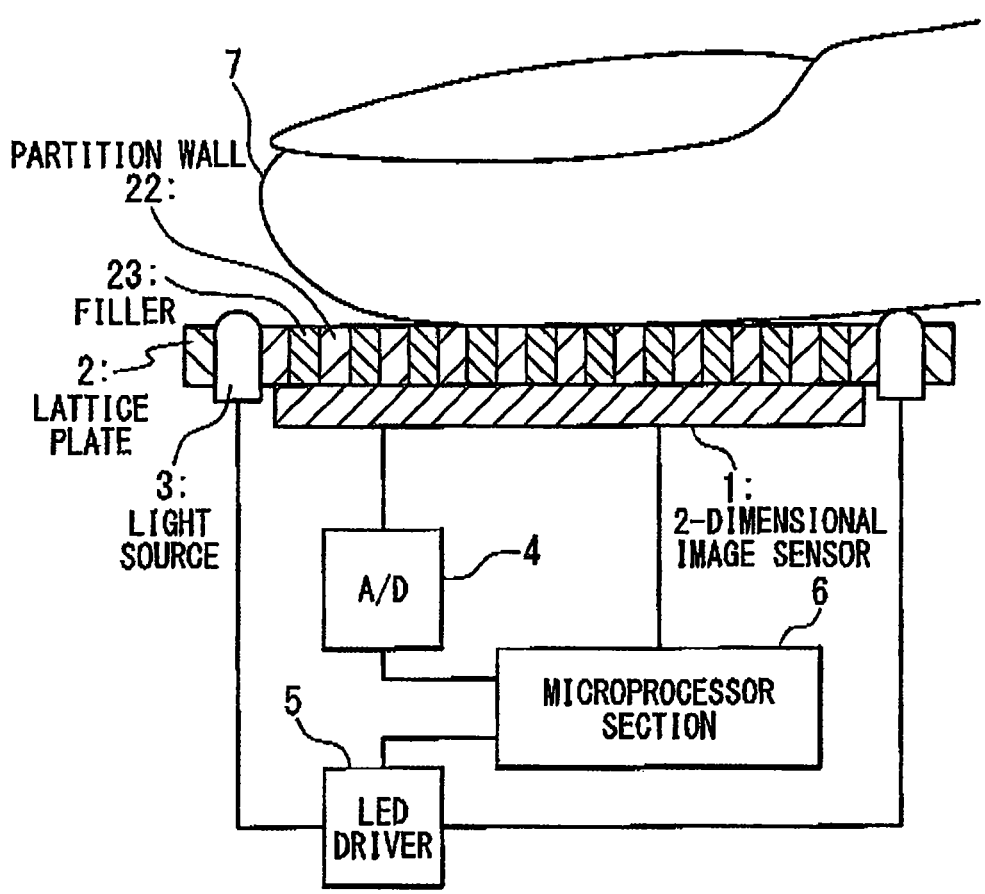
FIG. 5 is a lateral sectional view of an image reading apparatus according to a first embodiment of the present invention.

FIG. 5 is a diagram showing the configuration of the image reading apparatus according to the second embodiment of the present invention. With reference to FIG. 5, the image reading apparatus according to the second embodiment differs from the first embodiment shown in FIGS. 1A and 1B in that fillers 23 made of optically transmissible solid materials are inserted into the slits 21 of the lattice plate 2.

Figure 6A:
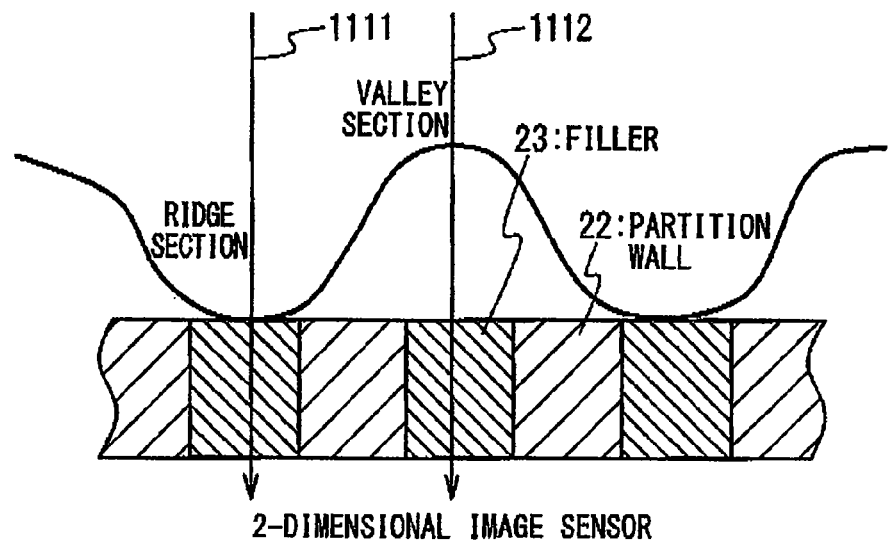
FIGS. 6A and 6B are diagrams showing an operation of the image reading apparatus according to the first or second embodiments of the present invention.

The bottom planes of the fillers 23 are adhered to the top plane of the 2-dimensional image sensor 1, and the top plane of the filler 23 is the same plane as the top plane of the partition wall 22. Thus, in order to read the fingerprint of the finger 7, when the finger cushion is pushed against the partition walls 22 of the lattice plate 2, the skin of the finger 7 is always brought into contact with the fillers 23. For this reason, among the lights that are emitted from the skin surface of the finger after being scattered inside the finger, the light emitted from the fingerprint ridge section in contact with the fillers 23 is directly inputted to the fillers 23, as shown by a numeral 1111 in FIG. 6A, and propagated through the filler 23 and arrives at the light receiving element in the 2-dimensional image sensor 1. Also, the light emitted from the fingerprint valley section that is not in contact with the fillers 23 is once inputted to an air layer, as shown by a numeral 1112, and propagated through the air layer and then inputted to the filler 23. After that, similarly to the light emitted from the fingerprint ridge section, it is propagated through the fillers 23 and arrives at the light receiving elements in the 2-dimensional image sensor 1.

Figure 6B:
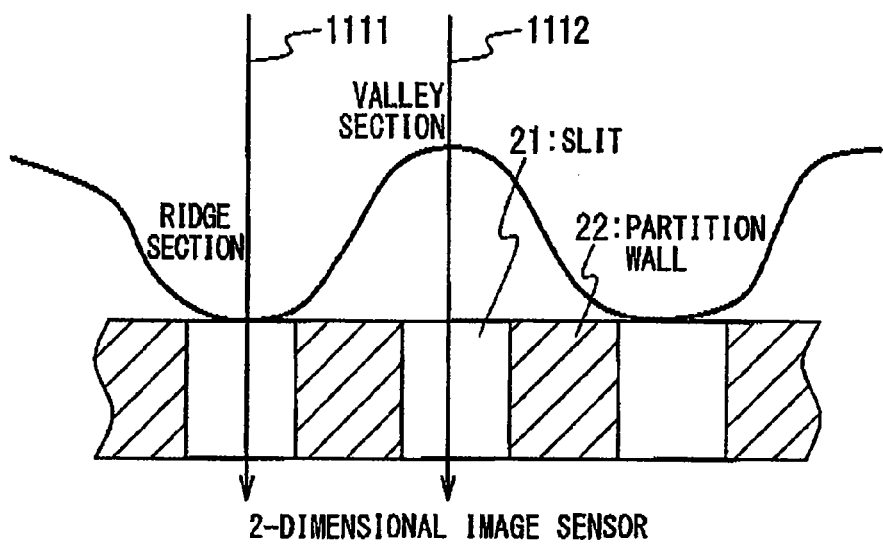

On the contrary, in case of the first embodiment in which the filler 23 does not exist in the slit 21, the light that is emitted from the skin surface of the finger after being scattered inside the finger is once inputted to the air layer and propagated through the air layer and then arrives at the light receiving elements in the 2-dimensional image sensor 1, as shown by the numerals 1111 and 1112 in FIG. 6B, independently of the fingerprint ridge section and the fingerprint valley section.

In case of the first embodiment shown in FIG. 6B, as mentioned above, the ridge section is detected as a dark region, and the valley section is detected as a bright region by the 2-dimensional image sensor 1, respectively. On the contrary, in case of the interposition of the fillers 23 shown in FIG. 6A, if a refractive index of the filler 23 is approximately the same value [1] as the air, this is equivalent to FIG. 6B in which the filler 23 does not exist. Thus, the ridge section is detected as the dark region, and the valley section is detected as the bright region by the 2-dimensional image sensor 1, respectively. However, if the value of the refractive index of the filler 23 becomes greater, the relation between the bright and dark regions is reversed. Then, the ridge section is detected as the bright region, and the valley section is detected as the dark region by the 2-dimensional image sensor 1, respectively. This is estimated from the following facts that, if the refractive index of the filler 23 is greater, the refractive index difference between the finger 7 and the air and the refractive index difference between the air and the filler 23 are greater than the refractive index difference between the finger 7 and the filler 23, and that until the light 1111 emitted from the ridge section in FIG. 6A arrives at the light receiving element, it passes through one boundary (the boundary between the finger and the filler) in which the refractive index difference is small, and on the other hand, since the light 1112 emitted from the valley section passes through the two boundaries (the boundary between the finger and the air and the boundary between the air and the filler) in which the refractive index difference is great, when it is emitted from the skin surface, the emission light from the valley section is greater in the magnitude than the light from the ridge section. However, when it arrives at the light receiving element, the light sent from the ridge section becomes relatively greater in the magnitude than the light from the valley section. In fact, in the fingerprint input apparatus noted in the seventh conventional example that carries out the imaging by using the 2-dimensional image sensor in which the scattered emission light from the finger is made close to the finger through the transparent protective cover made of glass and the like, the fingerprint image in which the valley section of the fingerprint serves as the dark region and the ridge section serves as the bright region is obtained.

For this reason, when the refractive index of the filler 23 has a certain value, the contrast between the ridge section and the valley section becomes 0. In this specification, the value of the foregoing refractive index is referred to as a singular point, and the filler 23 is made of the optically transmissible solid body having the refractive index of the value except values in vicinity of the singular point. The refractive index of the filler 23 will be discussed below.

Figure 7:
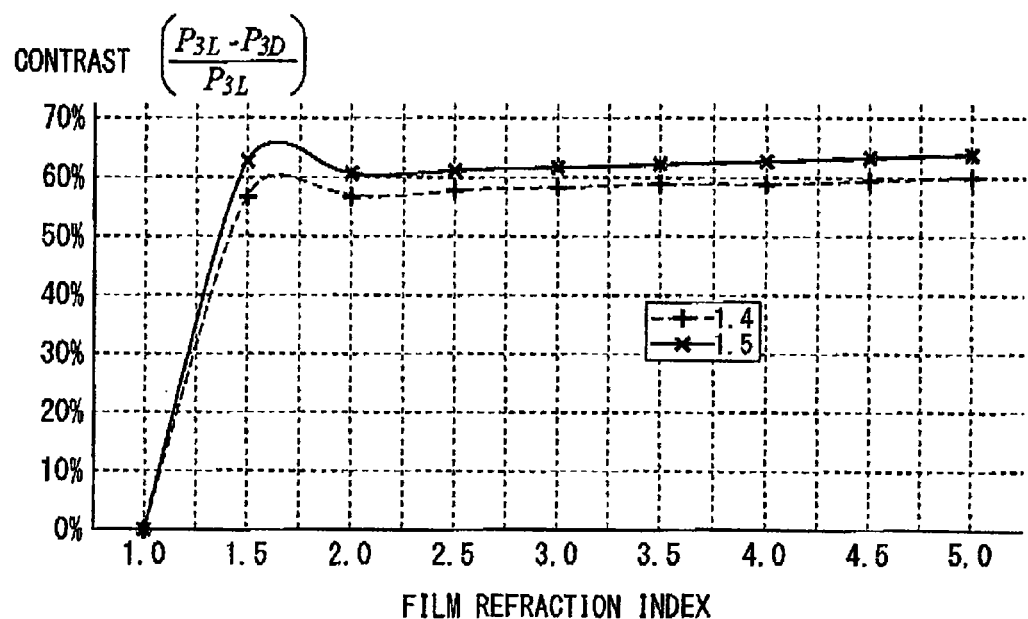
FIG. 7 is a graph showing a relation between contrast and refractive index of a transparent solid film existing between the 2-dimensional image sensor and the finger.

The eighth conventional example related to the proposal of this inventor analyzes a relation between contrast and the refractive index of a transparent solid film located between the 2-dimensional image sensor and the finger. According to it, the relation as shown in FIG. 7 is derived. In FIG. 7, the vertical axis shows the contrast that is calculated from $(P_{3L}-P_{3D})/P_{3L}$ when the power of light inputted to the transparent solid film immediately under the fingerprint ridge section is defined as $P_{3L}$ and the power of the light inputted to the transparent solid film immediately under the fingerprint valley section is defined as $P_{3D}$. The horizontal axis shows the refractive index of the transparent solid film. Also, a line obtained by connecting the points of + marks indicates an example in which the refractive index of the finger is assumed to be 1.4, and a line obtained by connecting the points of × marks indicates an example in which the refractive index of the finger is assumed to be 1.5. However, the graph of FIG. 7 is determined by calculating only the effect resulting from the difference of the refractive index and the skin of the finger, the air and the boundary of the transparent solid film, and this differs from the effect resulting from the structure inside the skin of the finger.

With reference to FIG. 7, when the refractive index of the transparent solid film is 1.0 and this value is equal to that of the air, the contrast is 0%. This is because in the graph of FIG. 7, the power of light sent to the ridge section from inside the skin is assumed to be equal to the power of light sent to the valley section. Originally, when the refractive index is 1.0, the same contrast as the first embodiment is obtained. In FIG. 7, that contrast value becomes minus. When the contrast obtained in the first embodiment is assumed to be C %, the value of the refractive index in which the contrast becomes C % in the graph of FIG. 7 serves as the singular point. Typically, because of C≈10, the singular point=1.1. When the filler 23 whose refractive index is 1.1 used, the contrast between the valley section and the ridge section is 0. Thus, the refractive index of the filler 23 is required to be equal to or larger than 1.0 and less than 1.1, or greater than 1.1. The optically transmissible solid body having the refractive index of 1.1 or less does not substantially exist. Thus, the filler 23 may be formed of the optically transmissible solid body having the refractive index that is substantially greater than 1.1.

On the other hand, with reference to FIG. 7, in the range in which the refractive index of the transparent solid film is between 1.4 and 2.0, the contrast is especially high. When the entire portion in which the skin is stripped is not in contact with the transparent solid film, the entire portion does not have the same contrast, and as mentioned above, the pattern in which the structure inside the finger is reflected is generated. For this reason, if the contrast between the ridge section that contacts with the transparent solid film and the valley section that does not contact is abnormally high as compared with the contrast of the pattern, when the dynamic range of the sensor is not wide, it is difficult to detect the pattern of the portion in which the skin is stripped. Therefore, the refractive index in the range between 1.4 and 2.0 in which the contrast is especially high in FIG. 7 is not suitable for the filler 23.

Moreover, as analyzed in the eighth conventional example related to the proposal of this inventor, when the refractive index of the transparent solid film becomes greater, the brightness is reduced even if the contrast appears. Also, noise caused by external disturbance light and noise generated in the circuit act as noise components, so that the S/N ratio is reduced. Thus, a probability that identification between the fingerprint ridge section and the fingerprint valley section is inaccurate becomes higher. In this way, an upper limit value of the refractive index is desired to be about 5.0.

As the result of the above-mentioned consideration, the refractive index of the filler 23 is desired to have a range from a value larger than 1.1 to the value less than 1.4 or from a value larger than 2.0 to the value less than 5.0.

As the solid material suitable for the filler 23 and having the refractive index of 1.4 or less, for example, there is glass whose main component is $BeF_3$ (beryllium fluoride). As the solid material suitable for the filler 23 and having the refractive index greater than 2.0, for example, there are glass including a large quantity of BaO and PbO, hematite, rutile, germanium, diamond, silicon and the like.

Figure 8:
FIG. 8 is a diagram showing an example of a fingerprint image read by the image reading apparatus according to the second embodiment of the present invention.

The fingerprint image of the finger 7 that is read by the image reading apparatus in the second embodiment in which the fillers 23 are embedded in the slits 21 is as shown in FIG. 8. The contrast of the ridge section is obtained even in a round skin separation portion in an upper left part of the image. However, the bright section and the dark section are reversed, which is different from another location. When the fillers 23 are filled in this way, the fingerprint ridge section becomes bright, and the valley section becomes dark on the basis of the refractive index of the filler 23 in accordance with the condition of the contact portion. Thus, the bright/dark relation is reversed as compared with the non-contact portion. This problem can be solved by the method of the imaging process and the fingerprint authentication. That is, through the edge emphasis process, only the continuity of the ridge section may be extracted and linked. Also, when the authenticating method based on the positional relation between feature points such as a branch point and end point of the fingerprint is employed, the reversion of the bright/dark relation has no influence on the authentication.

In this way, according to this embodiment, in addition to the effect similar to that of the first embodiment, there is the effect in which since the top plane of the lattice plate 2 is flat, dust is hard to deposit, and even if it is deposited, there is no fear that the dust is deposited on the slit 21 and the image quality is deteriorated, since the cleaning is easy.

Third Embodiment

Figure 9A:
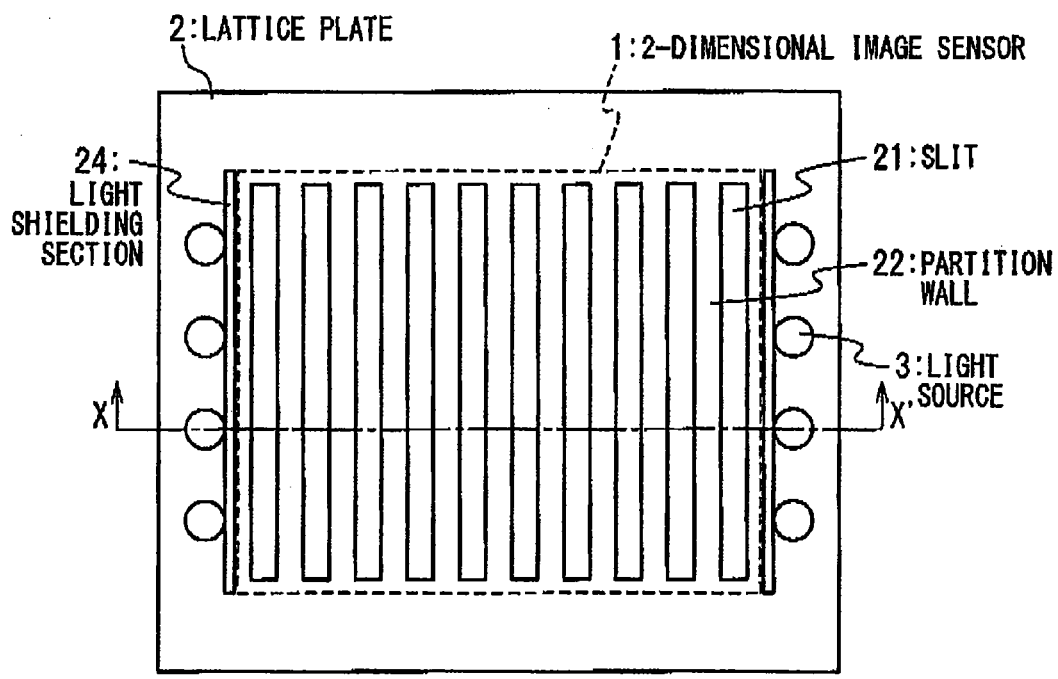
FIGS. 9A and 9B are a top view and a lateral sectional view of the image reading apparatus according to a third embodiment of the present invention.
Figure 9B:
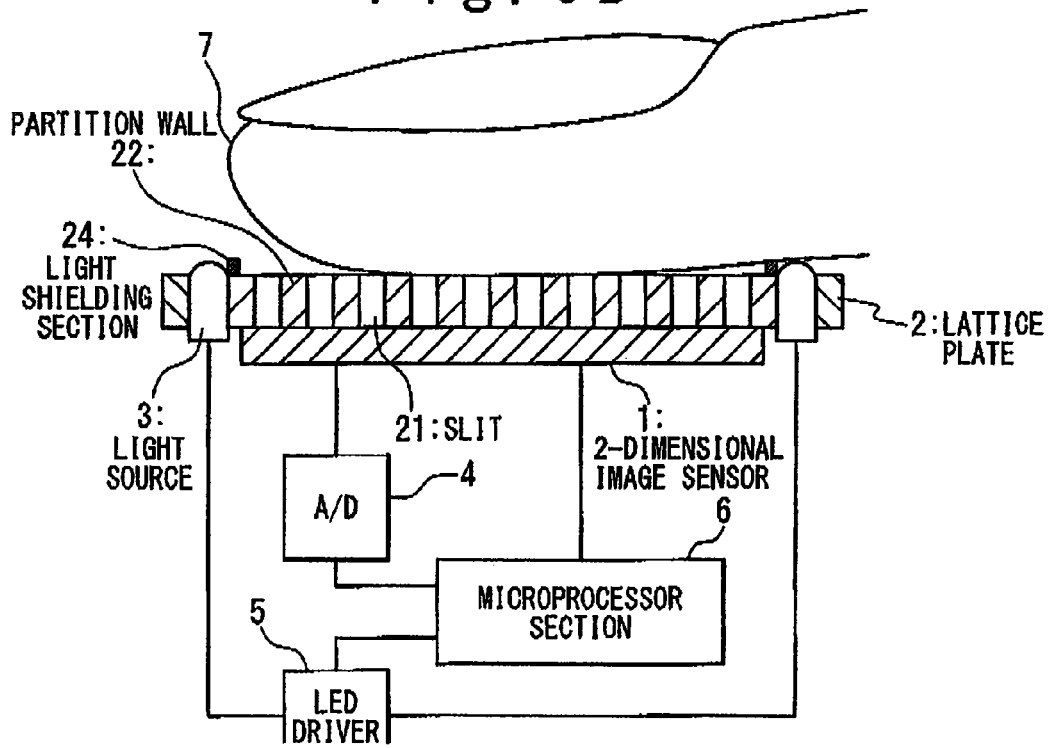

FIGS. 9A and 9B are diagrams showing an image reading apparatus according to the third embodiment of the present invention. With reference to FIGS. 9A and 9B, the image reading apparatus according to the third embodiment differs from the first embodiment in that the whole of the lattice plate 2 or a portion of the partition wall 22 is optically transmissible at least.

As the optically transmissible material used for the partition wall 22, it is possible to use the material similar to the material used for the filler 23 in the second embodiment, and the condition of the refractive index may be similar to that of the filler 23. If the lattice plate 2 is optically transmissible, light shielding section 24 are desired to be provided for shielding the light that is emitted from the light sources 3 through the lattice plate 2 to the light receiving elements in the 2-dimensional image sensor 1.

Figure 10:
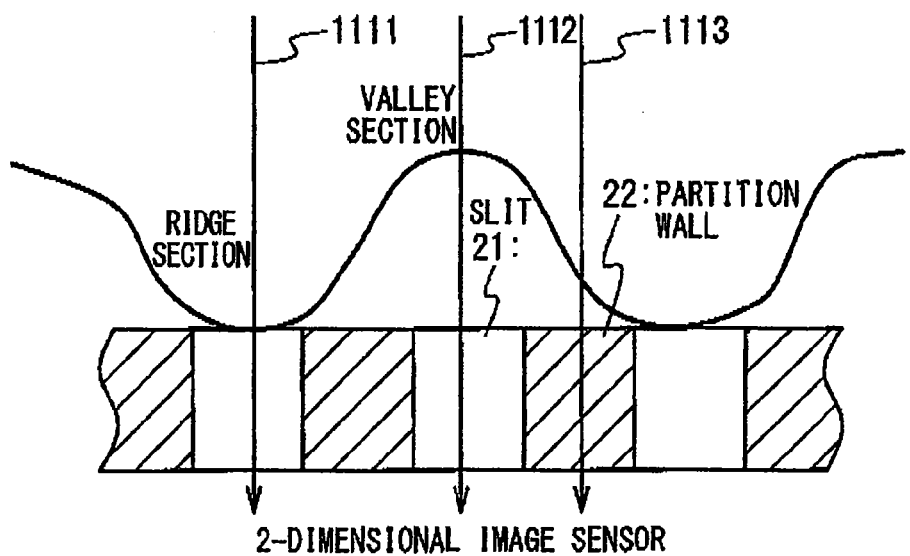
FIG. 10 is a diagram showing an operation of the image reading apparatus according to the third embodiment of the present invention.

In case of the third embodiment, light emitted from the finger 7 is inputted to the 2-dimensional image sensor 1 through the optically transmissible partition walls 22 as shown by a numeral 1113, in addition to the route in which the light is inputted to the 2-dimensional image sensor 1 through the slits 21 as shown by the numerals 1111 and 1112 of FIG. 10. Thus, this has a merit that a pitch between the partition walls 22 is not required to be set to the pitch P0 of the light receiving element 11 of the 2-dimensional image sensor 1 as shown in FIGS. 2A and 2B, and a pitch of the partition walls 22 is not required to be equal to or less than a half of a pitch of the light receiving elements as shown in FIG. 2C.

As can be estimated from the fact that the bright/dark relation between the fingerprint ridge section and the fingerprint valley section that is obtained by the 2-dimensional image sensor 1 is opposite between the first and second embodiments, in this embodiment, the fingerprint ridge section corresponding to the slit 21 and the fingerprint valley section serve as the bright region and the dark region, and the fingerprint ridge section in contact with the partition wall 22 and the fingerprint valley section opposite to the partition wall 22 serve as the dark region and the bright region. Thus, the bright part and the dark part are inverted for each location. However, this problem can be solved by a method of the imaging process and the fingerprint authentication. That is, through the edge emphasis, only the continuity of the ridge section may be extracted and linked. Also, when the authenticating method based on a positional relation between feature points such as a branch point and an end point of the fingerprint is employed, the reversion of the bright/dark relation has no influence on the authentication.

Fourth Embodiment

Figure 11:
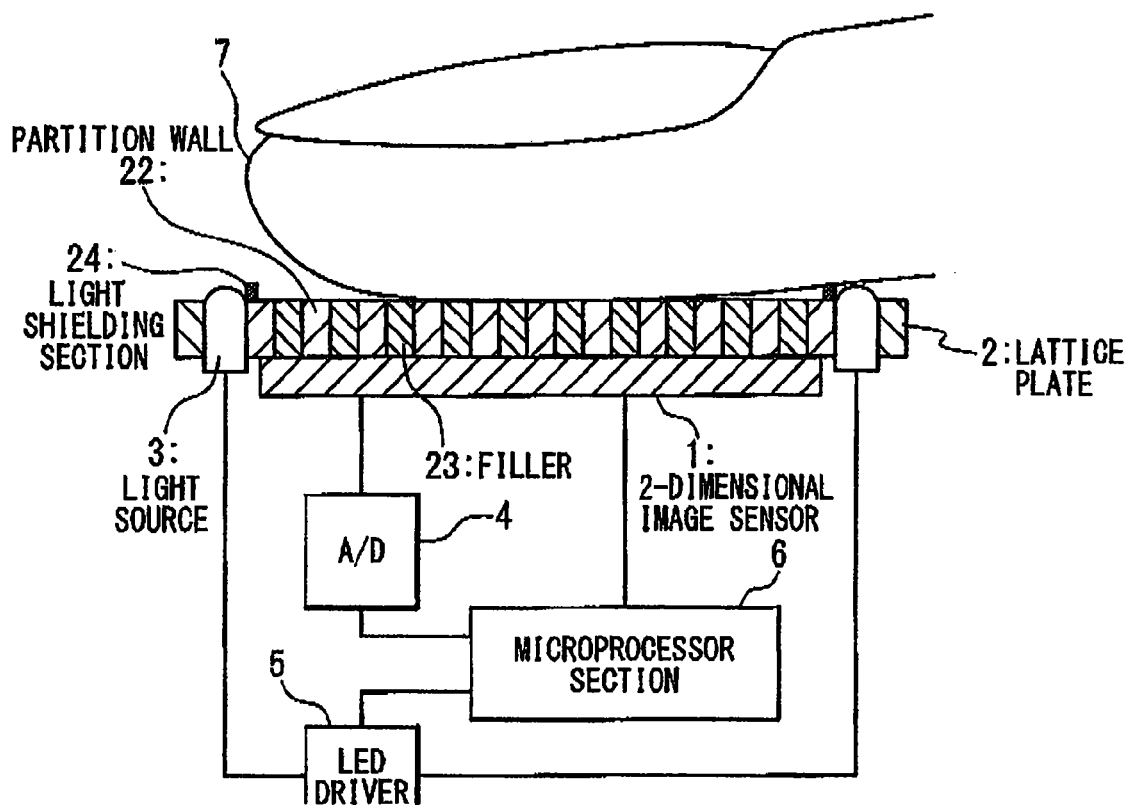
FIG. 11 is a lateral sectional view of the image reading apparatus according to a fourth embodiment of the present invention.

FIG. 11 is a diagram showing the image reading apparatus according to the fourth embodiment of the present invention. With reference to FIG. 11, the image reading apparatus according to the fourth embodiment differs from the second embodiment in that the whole of the lattice plate 2 or each partition wall 22 is optically transmissible at least As the optically transmissible material used for the partition wall 22, it is possible to use a material similar to the material used for the filler 23, and the condition of the refractive index may be similar to that of the filler 23. In this case, in addition to the use of material of the perfectly same material and refractive index, the material and the refractive index may be different between the filler 23 and the partition wall 22. If the lattice plate 2 is optically transmissible, the light shielding sections 24 are desired to be provided for shielding the light that are emitted from the light sources 3 through the lattice plate 2 to the light receiving elements in the 2-dimensional image sensor 1.

Figure 12:
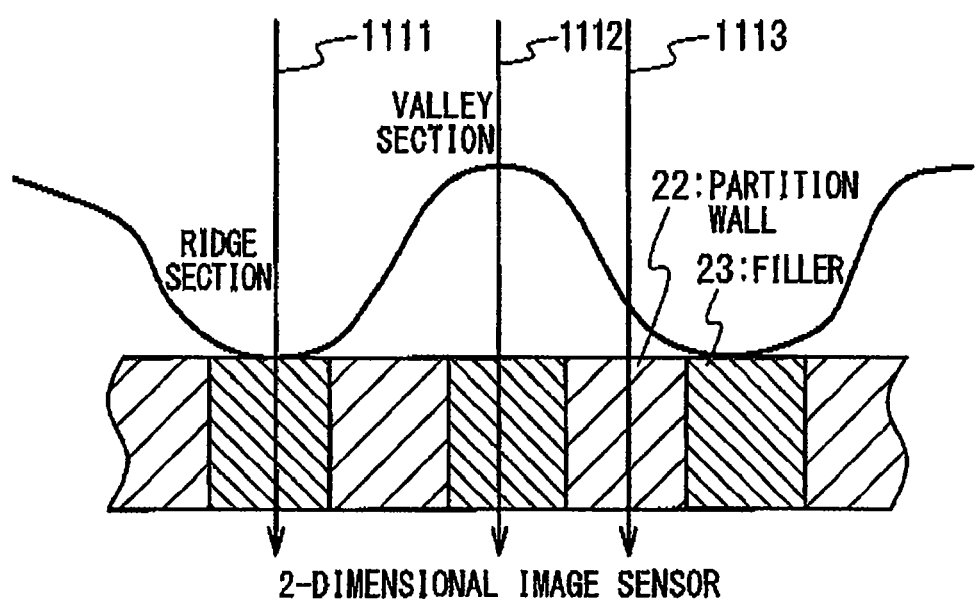
FIG. 12 is a diagram showing an operation of the image reading apparatus according to the fourth embodiment of the present invention.

In case of this embodiment, the light emitted from the finger 7 is inputted to the 2-dimensional image sensor 1 through the optically transmissible partition walls 22 specified by a numeral 1113, in addition to the route in which the light is inputted to the 2-dimensional image sensor 1 through the fillers 23 of the slits 21 as specified by the numerals 1111 and 1112 of FIG. 12. Thus, this has a merit that a pitch of the partition walls 22 is not required to be set to a pitch P0 of the light receiving elements 11 in the 2-dimensional image sensor 1 as shown in FIGS. 2A and 2B, and the pitch of the partition walls 22 is not required to be equal to or less than a half of a pitch of the light receiving elements as shown in FIG. 2C.

Also, in case of the fourth embodiment, there is a merit that both of: the fingerprint ridge section in contact with the filler 23 and the fingerprint valley section opposite to the filler 23; and the fingerprint ridge section in contact with the partition wall 22 and the fingerprint valley section opposite to the partition wall 22 serve as a bright region and a dark region.

Fifth Embodiment

Figure 13A:
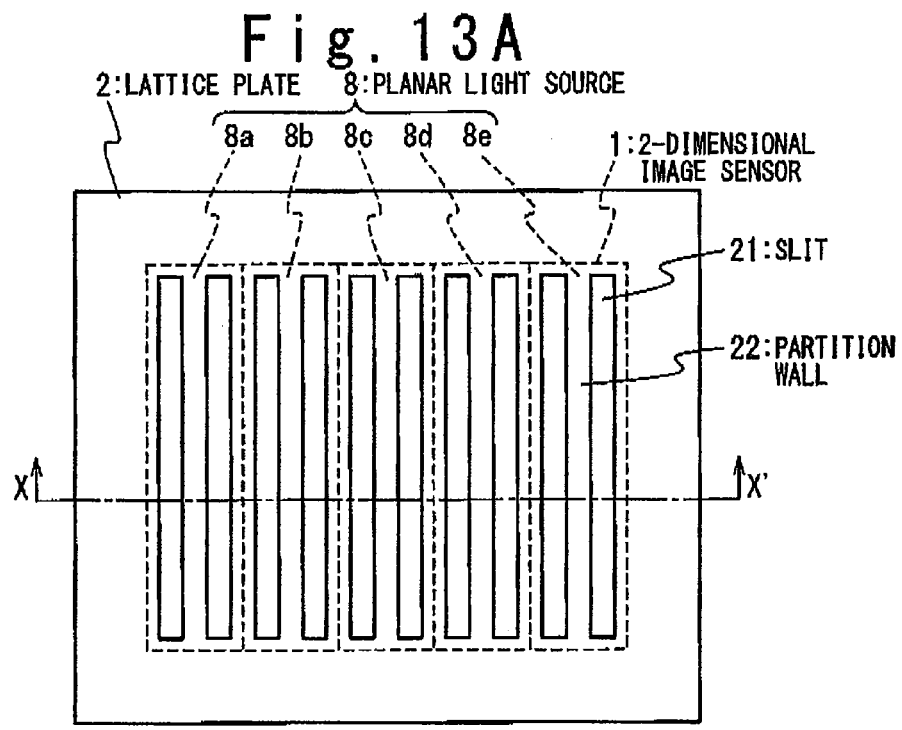
FIGS. 13A and 13B are a top view and a lateral sectional view of the image reading apparatus according to a fifth embodiment of the present invention.
Figure 13B:
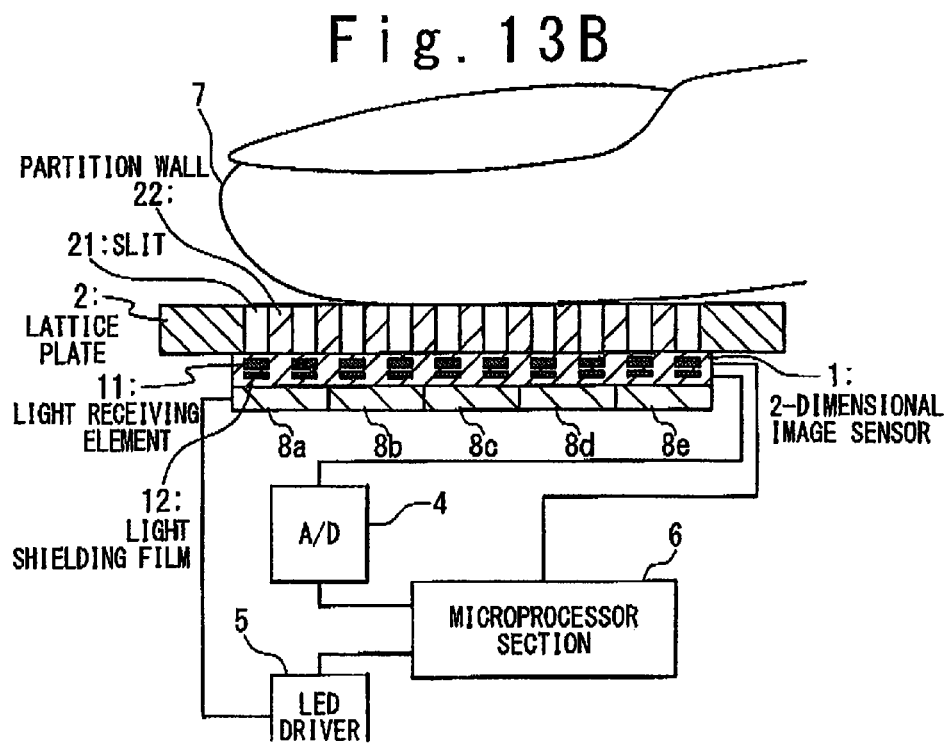

FIGS. 13A and 13B are diagram showing the image reading apparatus according to the fifth embodiment differs of the present invention. With reference to FIGS. 13A and 13B, the image reading apparatus according to the fifth embodiment differs from the third embodiment in that the image reading apparatus contains a planar light source 8 which is placed on the rear of the 2-dimensional image sensor 1 and emits uniform light to the finger 7 in contact with the lattice plate 2, instead of LEDs of the light source 3 arranged in the periphery of the lattice plate 2, and light shielding films 12 which are arranged on the rears of the light receiving elements 11 in the 2-dimensional image sensor 1 and shield the light from the planar light source 8 to the light receiving elements 11, instead of the light shielding sections 24.

When a thin film transistor is used which has a double-gate structure in which a photo sensing function and a selection transistor function are given to a photo sensor itself, as described in the third conventional example as the light receiving element 11, the light shielding film 12 can be realized by forming the gate electrode on a bottom side of material which shields the light.

The planar light source 8 is formed by arranging a plurality of planar light emitting devices 8a to 8e, which can be controlled to be turned on and off, independently of each other in the arrangement direction of the slits in the 2-dimensional image sensor 1 (the right/left direction in FIGS. 13A and 13B). As each of the planar light emitting devices 8a to 8e, a light source can be used in which a plurality of point light emitting devices such as LEDs are arranged in an array, or in which a light scattering plate made of obscure glass or the like is attached thereon.

Figure 14:
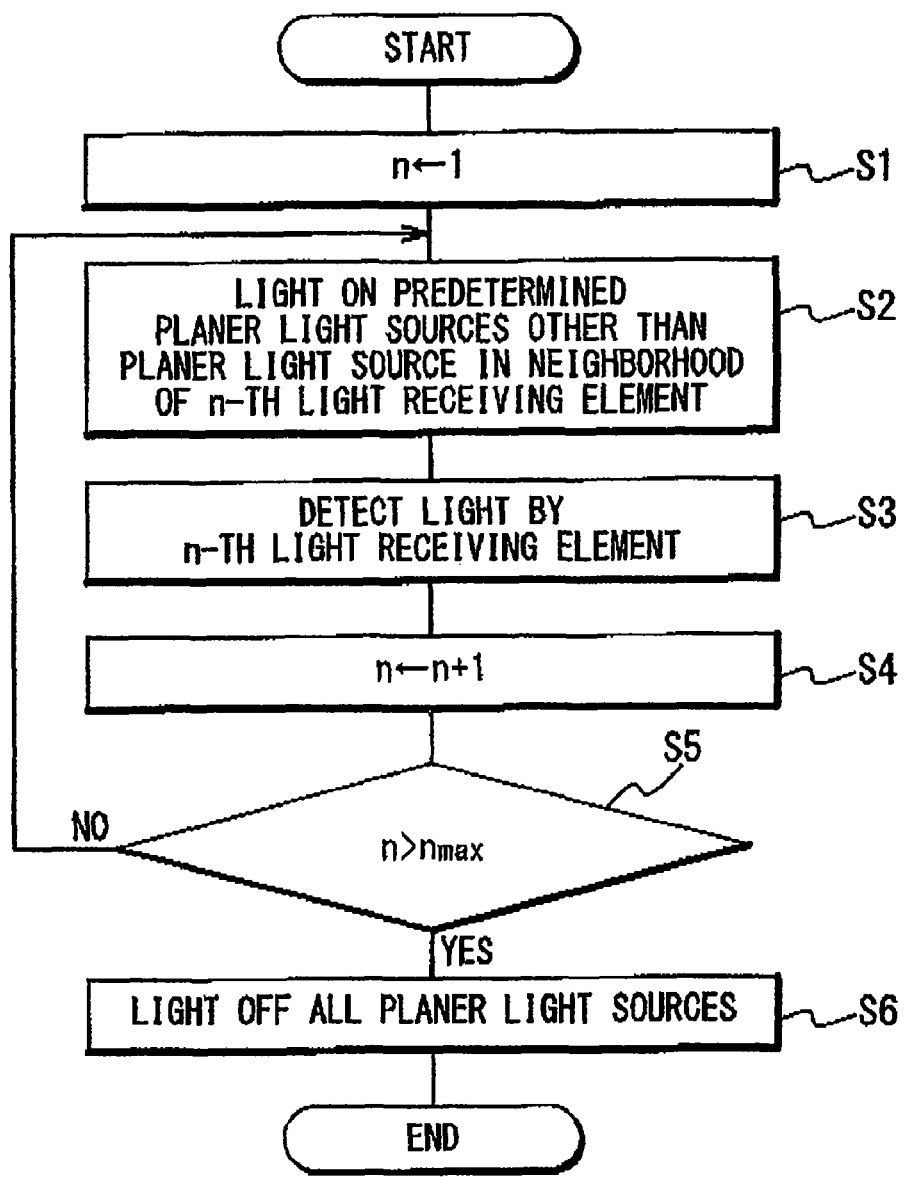
FIG. 14 is a flowchart showing a reading sequence of the image reading apparatus according to the fifth embodiment of the present invention.
Figure 18A:
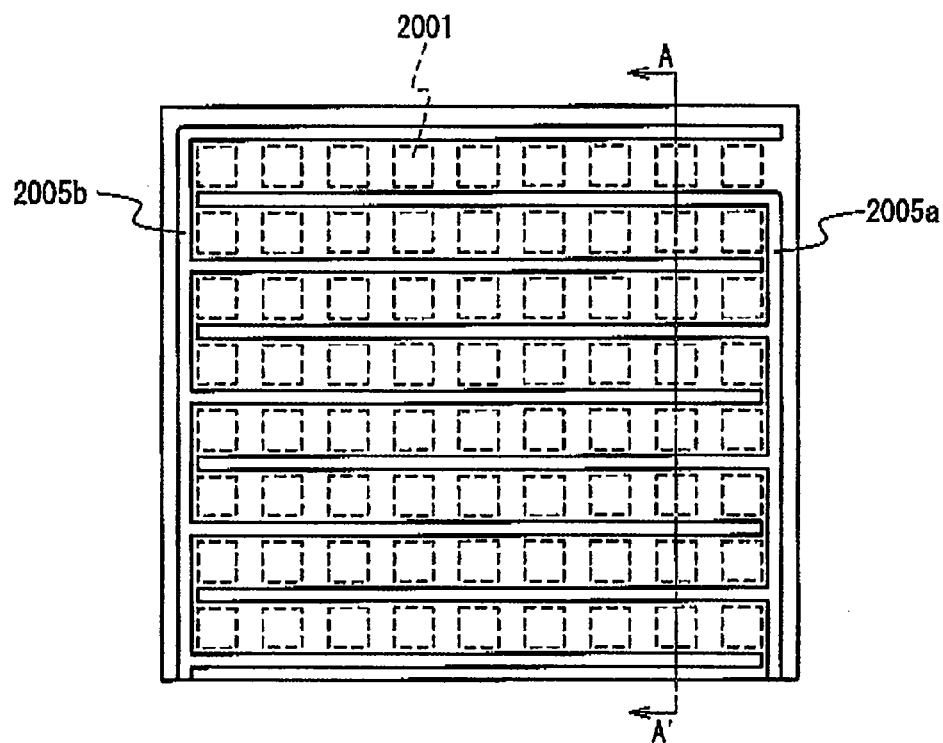
FIGS. 18A and 18B are a top view and a lateral sectional view of a conventional image reading apparatus.
Figure 18B:
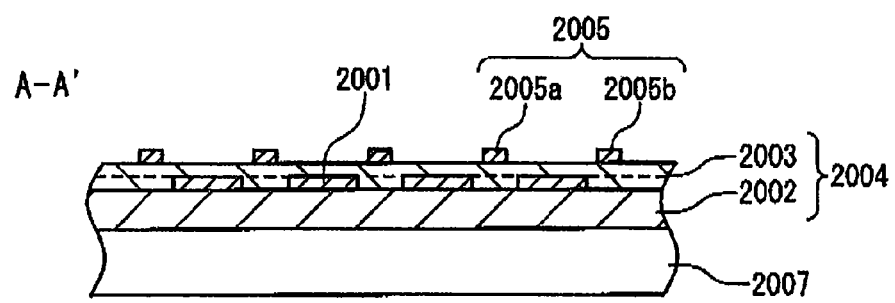

FIG. 14 shows one example of a read sequence of the image reading apparatus according to this embodiment. This sequence is controlled by the micro processor 6. In the situation that the cushion of the finger 7 is pushed against the partition walls 22 of the lattice plate 2 located above the 2-dimensional image sensor 1, the read control of the micro processor 6 is started.

At first, a variable n is set to "1" to manage a read target row, and among the light receiving elements of a plurality of rows contained in the 2-dimensional image sensor 1, the light receiving element on the first row is assumed to be a read target (Step S1). At this time, only predetermined planar light emitting devices other than the planar light emitting devices near the read target column are turned on in such a way that the light, which is emitted from the planar light source and reflected on the skin surface of the finger, is not inputted on the light receiving element on the first row serving as the read target among the planar light emitting devices 8a to 8e (Step S2). For example, in FIGS. 13A and 13B, if the light receiving element on the first row exists on the left side of the paper, the planar light emitting device 8a is turned off, and all of the remaining planar light emitting devices 8b to 8e are turned on. Or, such as only the planar light emitting device 8b, a part of the remaining planar light emitting devices may be turned on. In this situation, the read of the light receiving element on the first row is carried out. Specifically, after the light receiving element on the first row is once reset, an optically accumulating operation is started, and the read operation is then executed. When the read of the light receiving element on the first row has been completed, the variable n is increased by +1 and changed to 2 (Step S4). Then, the light receiving element on a second row is read similarly to the light receiving element on the first row. Also, at this time, the reading operation is performed in the situation that the planar light emitting device near the read target is turned off and the remaining predetermined planar light emitting devices are turned on. When the operations similar to the foregoing operations performed on the first and second rows are repeatedly performed on all of the remaining rows and completed (Step S5: YES), all of the planar light emitting devices that have been turned on are turned off (Step S6), and a series of read cycles is finished.

According to the fifth embodiment, since the planar light source 8 is provided on the rear of the 2-dimensional image sensor 1, the flat space occupied by the image reading apparatus can be decreased.

Also, according to the fifth embodiment, the reading operation is performed in the situation that the predetermined planar light emitting devices other than the planar light emitting device(s) near the read target of the 2-dimensional image sensor 1, it is possible to protect the light, which is emitted from the planar light source 8 and reflected on the skin surface of the finger, from being inputted to the light receiving element, and also possible to prevent the drop in the contrast between the fingerprint ridge section and the valley section. That is, in the reading operation through the slit 21, as explained in the first embodiment, the fingerprint valley section serves as the bright region, and the fingerprint ridge section serves as the dark region. However, the illumination from below the slit 21 causes the fingerprint ridge section to be brightly illuminated, as compared with the fingerprint valley section. Thus, this leads to the drop in the contrast.

In this embodiment, the partition wall 22 is made of the optically transmissible material so that the light from the planar light source 8 is excellently sent to the finger 7. However, since there is the light that is inputted to the finger 7 from the slits 21 located above the planar light emitting devices 8 which are in the on state, the partition walls 22 may be made of the light shielding material, similarly to the first embodiment.

Also, the filler 23 similar to the second embodiment may be inserted into the slit 21. In this case, in the reading operation through the filler 23, as having been described in the second embodiment, the fingerprint valley section serves as the dark region, and the fingerprint ridge section serves as the bright region. Thus, when the illustration is performed from below the filler 23, the contrast between the fingerprint valley section and the fingerprint ridge section can be further emphasized. Therefore, the control for turning off the planar light emitting device(s) near the read target in the 2-dimensional image sensor 1 is not required, and it is desired to be turned on, reversely and positively.

Other Embodiments

As mentioned above, the present invention has been described by exemplifying the several embodiments. However, the present invention is not limited to only the above-mentioned embodiments. For example, the following variation is also included in the present invention.

An array pattern of the partition walls, which attains the role as a guide so that the skin surface of the finger 7 keeps a non-contact state in a constant distance from the top plane of the 2-dimensional image sensor 1, is not limited to the partition walls 22 formed in parallel on the lattice plate 2 as having been described in the embodiments. For example, any pattern may be employed such as a pattern arranged in an oblique direction as shown in FIG. 15A, or a pattern arranged to intersect longitudinally and laterally, as shown in FIG. 15B. Also, as shown in FIG. 15C, the pattern may be configured such that a pair of conductive lattice plates 25 and 26 in which comb teeth are alternately tangled are linked through an insulator 27, and at least one of the lattice plates 25 and 26 is grounded, thereby discharging the static electricity charged on the finger and then detecting the contact of the finger.

Moreover, the partition walls may be formed integrally with the 2-dimensional image sensor 1, in addition to the formation on the lattice plate 2 of the body different from the 2-dimensional image sensor 1. For example, a layer having a thickness between about several tens of micrometers and several hundred micrometers is formed on the sensor protection film of the highest layer in the 2-dimensional image sensor 1, and this layer is processed to form a pattern corresponding to the partition walls 22 and the slits 21. Also, as shown in FIGS. 16A and 16B, a plurality of micro partition walls 13 may be formed on the sensor protection film of the 2-dimensional image sensor 1. In this case, the relation between a height H of the partition wall 13 and a distance W between the partition walls adjacent to each other corresponds to the relation between a height H of the partition wall 22 and a width W of the slit 21 in the first embodiment.

Also, in the image reading apparatus of the present invention, there are a large number of partition walls. Moreover, the optically transmissible filler which is different in the refractive index from the partition wall is inserted into the slit. Thus, there is a slight probability that a pattern of the partition wall, the fillers or the like, appears as noise in the read image. For this reason, in order to remove this influence, when a replica of the finger that has a smooth skin surface without any fingerprint, namely, a standard detection sample in which the read target does not exist is read, the image of the 2-dimensional image sensor 1 is stored as a compensation image in a memory of the micro processor 6. This compensation image includes a pattern of the partition wall, the filler or the like. Then, the influence of the noise may be removed by subtracting the compensation image from the read image obtained when the finger 7 is actually read.

Also, the above-mentioned embodiments include the light source 3 for illustrating the finger 7 from the side or the planar light source 8 for illustrating from the rear. However, the illustrating manner may be arbitrary, including the light source for illustrating from above the finger 7. Moreover, the fingerprint can be read by using only natural light. Thus, all of the light sources may be also omitted.

Also in the above-mentioned respective embodiments, the read of the fingerprint of the finger is targeted. However, they can be naturally applied to the read of a different skin pattern such as a palm pattern and the like.

As mentioned above, the image reading apparatus according to the present invention is useful for a reading apparatus that stably reads the pattern of the fingerprint of the finger and the like and has a small scale and a low price. In particular, the image reading apparatus according to the present invention is suitable for the apparatus that can input living body features even under bad conditions such as the wet or dry state of the finger and skin separation caused by dermatitis.

What is claimed is:

1. An image reading apparatus comprising:
    a 2-dimensional image sensor having a plurality of light receiving elements arranged in a matrix, and configured to detect an image of a detection target;
    a plurality of partition walls provided on said 2-dimensional image sensor and configured to hold said detection target in a non-contact state in a predetermined distance from an upper surface of said 2-dimensional image sensor, thereby forming a plurality of slits, where a length of each slit spans more than one light receiving element in the matrix comprising the plurality of light receiving elements; and
    a light source configured to illuminate the detection target from a back side of said 2-dimensional image sensor, wherein
    said light source comprises a plurality of planar light sources which are arranged in a vertical scanning direction of said 2-dimensional image sensor and which can be individually turned off or on at different time intervals, and
    when read rows are sequentially scanned, the planar light sources corresponding to a target read row being actively scanned and read are turned off and the planar light sources not corresponding to the target read row are turned on.

2. The image reading apparatus according to claim 1, wherein said plurality of partition walls function as shading members.

3. The image reading apparatus according to claim 1, wherein said plurality of partition walls function as light transmissible members.

4. The image reading apparatus according to claim 3, wherein a refractive index of said plurality of partition walls is larger than 1.1 and is smaller than 1.4 or is larger than 2.0 and is smaller than 5.0.

5. The image reading apparatus according to claim 1, wherein a light transmissible filler is inserted in each of said plurality of slits.

6. The image reading apparatus according to claim 5, wherein a refractive index of said plurality of partition walls is larger than 1.1 and is smaller than 1.4 or is larger than 2.0 and is smaller than 5.0.

7. The image reading apparatus according to claim 1, wherein said plurality of slits are located directly on or above said plurality of light receiving elements of said 2-dimensional image sensor.

8. The image reading apparatus according to claim 1, wherein a height of each of said plurality of partition walls is equal to or more than 10 μm and equal to or less than 200 μm.

9. The image reading apparatus according to claim 1, further comprising:
    an image processing section configured to hold a reference read image of a target having no pattern and to subtract the reference read image from the image read by said 2-dimensional image sensor.

10. The image reading apparatus according to claim 1, wherein said plurality of partition walls and said 2-dimensional image sensor are unified.

11. The image reading apparatus according to claim 1, wherein said plurality of partition walls are provided for a lattice plate located on said 2-dimensional image sensor.

* * * * *